United States Patent
Notaras et al.

(10) Patent No.: US 10,363,612 B2
(45) Date of Patent: Jul. 30, 2019

(54) POWERED DRILL APPARATUS

(71) Applicants: John Arthur Notaras, Sydney (AU);
Angelo Lambrinos Notaras, Sydney (AU)

(72) Inventors: John Arthur Notaras, Sydney (AU);
Angelo Lambrinos Notaras, Sydney (AU)

(*) Notice: Subject to any disclaimer, the term of this patent is extended or adjusted under 35 U.S.C. 154(b) by 722 days.

(21) Appl. No.: 14/782,599

(22) PCT Filed: Mar. 31, 2014

(86) PCT No.: PCT/AU2014/050008
§ 371 (c)(1),
(2) Date: Oct. 5, 2015

(87) PCT Pub. No.: WO2014/161047
PCT Pub. Date: Oct. 9, 2014

(65) Prior Publication Data
US 2016/0039013 A1  Feb. 11, 2016

(30) Foreign Application Priority Data

Apr. 3, 2013 (AU) ................................ 2013901142

(51) Int. Cl.
*B23B 45/00* (2006.01)
*F16H 3/097* (2006.01)
(Continued)

(52) U.S. Cl.
CPC .......... *B23B 45/001* (2013.01); *B23B 45/008* (2013.01); *B23B 45/048* (2013.01); *F16H 3/097* (2013.01); *F16H 2003/0822* (2013.01)

(58) Field of Classification Search
CPC ..... B23B 45/001; B23B 45/008; F16H 3/097; F16H 2003/0822
(Continued)

(56) References Cited

U.S. PATENT DOCUMENTS 3,990,523 A * 11/1976 Schramm .............. B23B 45/048
16/111.1
4,010,819 A * 3/1977 Ekstrom ................ B25D 17/12
173/168
(Continued)

FOREIGN PATENT DOCUMENTS

DE    102011078082 A1   12/2012

OTHER PUBLICATIONS

International Search Report dated Jun. 27, 2014 in International Patent Application No. PCT/AU2014/050008.
(Continued)

*Primary Examiner* — Robert F Long
*Assistant Examiner* — Xavier A Madison
(74) *Attorney, Agent, or Firm* — Venable LLP; Michele V. Frank

(57) ABSTRACT

A portable power drill (11) is disclosed having a chuck or drill collar (14) at one end and a substantially cylindrical (or frusto-conical) twist throttle handle (25, 125, 225) at the other end. Rotation of the handle in the direction of forward rotation of the chuck decreases the drill speed and, conversely, rotation of the handle in the direction of reverse rotation of the chuck increases the drill speed. Consequently, in the event of an auger locked in the chuck becoming jammed, the reaction forces experienced by the drill unit rotate the drill unit in a direction such that throttle decreases the drill speed. In addition, the drill unit is provided with forward (44) and reverse gears (45) and a forward/reverse selection mechanism (48, 50, 51) which is actuated by a forward force, or a withdrawing force respectively being applied to the drill unit via an operator who holds the handles (20, 25) of the drill unit.

16 Claims, 9 Drawing Sheets

(51) Int. Cl.
    *B23B 45/04*       (2006.01)
    *F16H 3/08*        (2006.01)
(58) Field of Classification Search
    USPC .................................................. 173/221, 213
    See application file for complete search history.

(56) References Cited

U.S. PATENT DOCUMENTS

| | | | | |
|---|---|---|---|---|
| 4,185,386 | A * | 1/1980 | Nordin | A61C 1/05 |
| | | | | 433/130 |
| 5,064,003 | A * | 11/1991 | Neroznikov | E21B 6/00 |
| | | | | 173/1 |
| 7,823,652 | B2 * | 11/2010 | Nemcek | A01D 34/90 |
| | | | | 173/1 |
| 2003/0164242 | A1 | 9/2003 | Richter et al. | |
| 2003/0190228 | A1 * | 10/2003 | Snider | B25F 5/00 |
| | | | | 415/1 |
| 2013/0164242 | A1 | 6/2013 | Tamareselvy et al. | |
| 2013/0305860 | A1 * | 11/2013 | Xu | F16H 3/14 |
| | | | | 74/404 |

OTHER PUBLICATIONS

Written Opinion dated Jun. 27, 2014 in International Patent Application No. PCT/AU2014/050008.

* cited by examiner

POWERED DRILL APPARATUS

This application is a U.S. National Stage of International Patent Application No. PCT/AU2014/050008, filed Mar. 31, 2014, which in turn claims priority to Australian Patent Application No. 2013901142 filed Apr. 3, 2013, priority of which is also claimed herein. The entire content of the foregoing applications is incorporated herein by reference in its entirety.

FIELD OF THE INVENTION

The present invention relates to portable powered drills and, in particular, to such drills which are powered by internal combustion engines. Such drills are predominantly used in rural activities such as fencing, building stockyards and general construction work utilising wood. Such drills are also used in the construction of wharfs, for example.

BACKGROUND ART

One type of drill used hitherto has been a chainsaw which is modified so as to remove the cutting blade and chain and attach an auger attachment. Essentially the engine of the chainsaw provides the power and the auger attachment creates the drill. Such modified chainsaws have been known for over 30 years.

More recently, dedicated drills had been produced by a range of manufacturers including Tanaka, Stihl and Echo. Such drills comprise a chuck to hold an auger bit, a gearbox and a small internal combustion engine. One of the handles by which the drill is held by an operator in use, is a substantially vertical handle which is at the rear of the machine. Typically an unbalanced second handle is provided which extends substantially horizontally and to the left (and occasionally selectively either the left or right) of the machine and is located towards the middle of machine. Thus in operation such prior art machines are held by the operator with the operator's left-hand on the second handle with the palm of the left hand horizontal, and with the operator's right hand on the first handle with the palm of the right hand vertical. The first handle generally also contains a throttle control lever or trigger.

Typically the gasoline engines of such prior art drills have an operational speed of approximately 7000-9000 rpm and the gearboxes have gear reduction ratios between approximately 15:1 to 30:1.

In rural fencing, it is common to use hardwood fence posts in which multiple holes for spaced apart multiple wires are drilled using a wood auger having a diameter of approximately 1¼ inch (32 mm) since this is a convenient size to receive a single strand of the barbed wire which is almost universally used in rural fencing. A wood auger of this diameter produces a very strong reactive torque in the drill which tends to move the drill unit in the opposite direction of rotation to that of the drill auger. This reactive torque must be counteracted by the operator who must maintain a strong grip on both handles.

Many fence posts, particularly fence posts used for corners and fence posts used for gates and stockyards, have a large cross-sectional size, typically with a transverse dimension of approximately 10-15 inches (250 mm-375 mm). In order to drill a hole 10-15 inches in length, it is typically necessary to reverse the auger rotation every 2-3 inches (50-75 mm) of drilling (depending on the timber variety) to clear the drilled hole of wood chips, and also prevent the auger from binding up and thereby severely jamming.

Some prior art drill units are provided with a reverse gear. When drilling with these prior art units, in order to clear a drilled hole of woodchips, for example, it is necessary to undertake the following procedure:
1. De-accelerate the throttle so as to reduce the engine speed to idle speed,
2. Remove left hand from left handle whilst balancing the drill with the right hand,
3. Using the left hand, manually engage the reverse gear lever and, if necessary, juggle the gear teeth so that they mesh and thus engage the reverse gear,
4. Return left hand to left handle,
5. Accelerate the engine with the reverse gear engaged so as to extract the auger,
6. Repeat step 1,
7. Repeat step 2,
8. Using the left hand, manually engage the forward gear lever and, if necessary, juggle the gear teeth so that they mesh and thus engage the forward gear,
9. Repeat step 4, and
10. Accelerate the engine with the forward gear engaged so as to rotate and advance the auger.

This operational procedure is very cumbersome and time-consuming. Furthermore, because the quickly rotating auger can hit a hidden knot, or a similarly hidden split in the wood, the auger is liable to suddenly jam without any warning. Such a jam causes a sudden reactive torque of severe magnitude which often causes the operator to lose his grip with his left hand. The consequence is that the drill unit suddenly spins out of control whilst the operator's right hand is still holding the trigger throttle control at a position near to, or at, its full rpm setting. This can cause injuries to the operator's hand, wrist or fingers, and broken bones are by no means unknown. The fundamental problem is that the suddenness with which a jam occurs does not give the operator sufficient time to release the trigger throttle of the engine, and thereby increase the operator's chance of avoiding injury.

GENESIS OF THE INVENTION

The genesis of the present invention is a desire to produce a portable powered drill, preferably with an internal combustion engine, which has a much reduced likelihood of operator injury in the event of a jam.

SUMMARY OF THE INVENTION

In accordance with a first aspect of the present invention there is disclosed a portable power drill unit comprising an operational axis having a chuck means at one end and a substantially cylindrical or frusto-conical twist throttle handle at the other end, and wherein rotation of the handle in the direction of forward rotation of the chuck means decreases the drill speed, and rotation of the handle in the direction of reverse rotation of the chuck means increases the drill speed, whereby reaction forces created by a jammed auger rotated by said chuck means decrease the drill speed.

In accordance with a second aspect of the present invention there is disclosed a portable power drill unit having an operational axis defined by a chuck means at one end and a substantially cylindrical or frusto-conical twist throttle handle at the other end, a motor located intermediate said chuck means and twist throttle handle, and a second handle located above said motor and extending transversely to said operational axis.

Preferably the second handle extends between a pair of uprights extending one to either side of the drill unit. Preferably the motor is an internal combustion engine.

According to a still further aspect of the present invention there is provided a portable drill unit having an internal combustion engine, a pair of handles able to be held by an operator, a gearbox including forward and reverse gears, a chuck means, and a forward/reverse selection mechanism connected with said gearbox, said forward/reverse selection mechanism being actuated by a forward force, or a withdrawing force, respectively being applied to said drill unit by an operator holding said handles.

According to another aspect of the present invention there is provided a method of de-accelerating a portable power drill unit in the event of an auger or drill bit rotated by said drill unit jamming in use, said method comprising the steps of:

rotating the auger or drill bit in a first direction,
providing a twist throttle handle having an axis substantially coincident with, or parallel to, the axis of rotation of said auger or drill bit, and
arranging for rotation of said twist throttle handle in the direction opposite to the direction of rotation of said auger or drill bit, to increase the speed of said drill unit, and vice versa.

According to a still further aspect of the present invention there is disclosed a gear train for a drill unit having a substantially aligned driven shaft and an output shaft, said output shaft having a chuck means, said gear train being interposed between said shafts and including an intermediate shaft substantially perpendicular to said aligned shafts, a first pinion gear driving said intermediate shaft, and a second pinion gear rotated by said intermediate shaft and meshed with two counter rotating crown gear wheels, each said counter rotating gear wheel including a clutch means connected with said output shaft, and spring means interposed between said chuck means and said counter rotating gear wheels to selectively engage either one of said clutch means to permit corresponding selective rotation of said output shaft in either direction.

BRIEF DESCRIPTION OF THE DRAWINGS

A preferred embodiment of the invention will now be described, by way of example only, with reference to the accompanying drawings in which.

DETAILED DESCRIPTION

Figure 1:
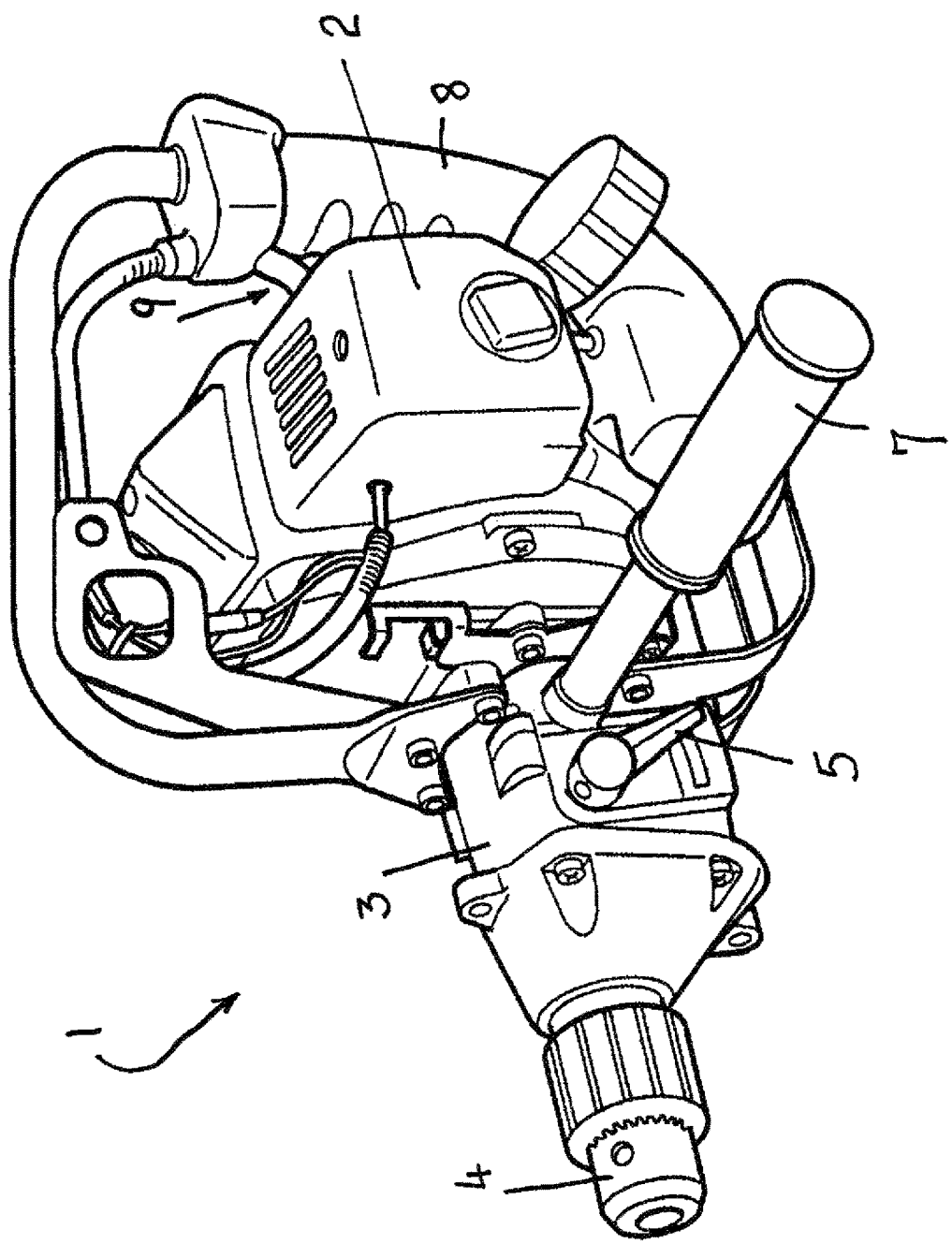
FIG. 1 is a perspective view from the front of a prior art drill unit.

As seen FIG. 1, a prior art drill unit 1 is illustrated, the drill unit being sold under the trade name TANAKA. The drill unit has an internal combustion engine 2, and a gearbox 3 which drives a chuck 4. The gearbox has a forward or reverse gear selector lever 5. The drill unit 1 has a left handle 7 (which is to say a handle held by the left hand of the operator), a right handle 8 (which is to say a handle held by the right hand of the operator), and a trigger throttle control 9 (also operated by the right hand of the operator). The drill unit 1 suffers from all the disadvantages referred to in the introductory portion of the specification, particularly in relation to the danger of injury in the event of the auger (not illustrated) jamming and in relation to the slow procedure to move from forward to reverse gear, and vice versa.

Figure 2:
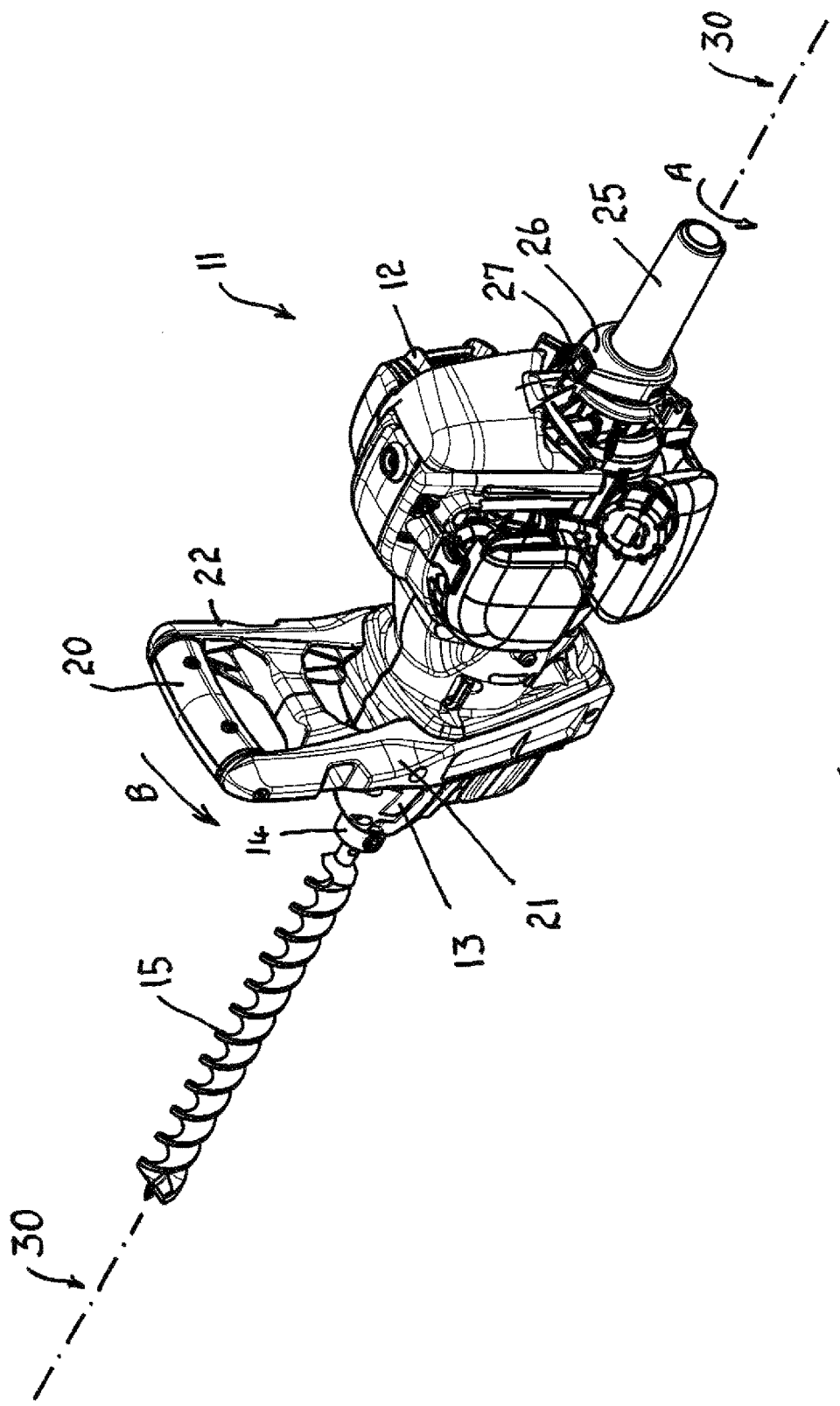
FIG. 2 is a perspective view from the rear of the drill unit of the preferred embodiment.
Figure 3:
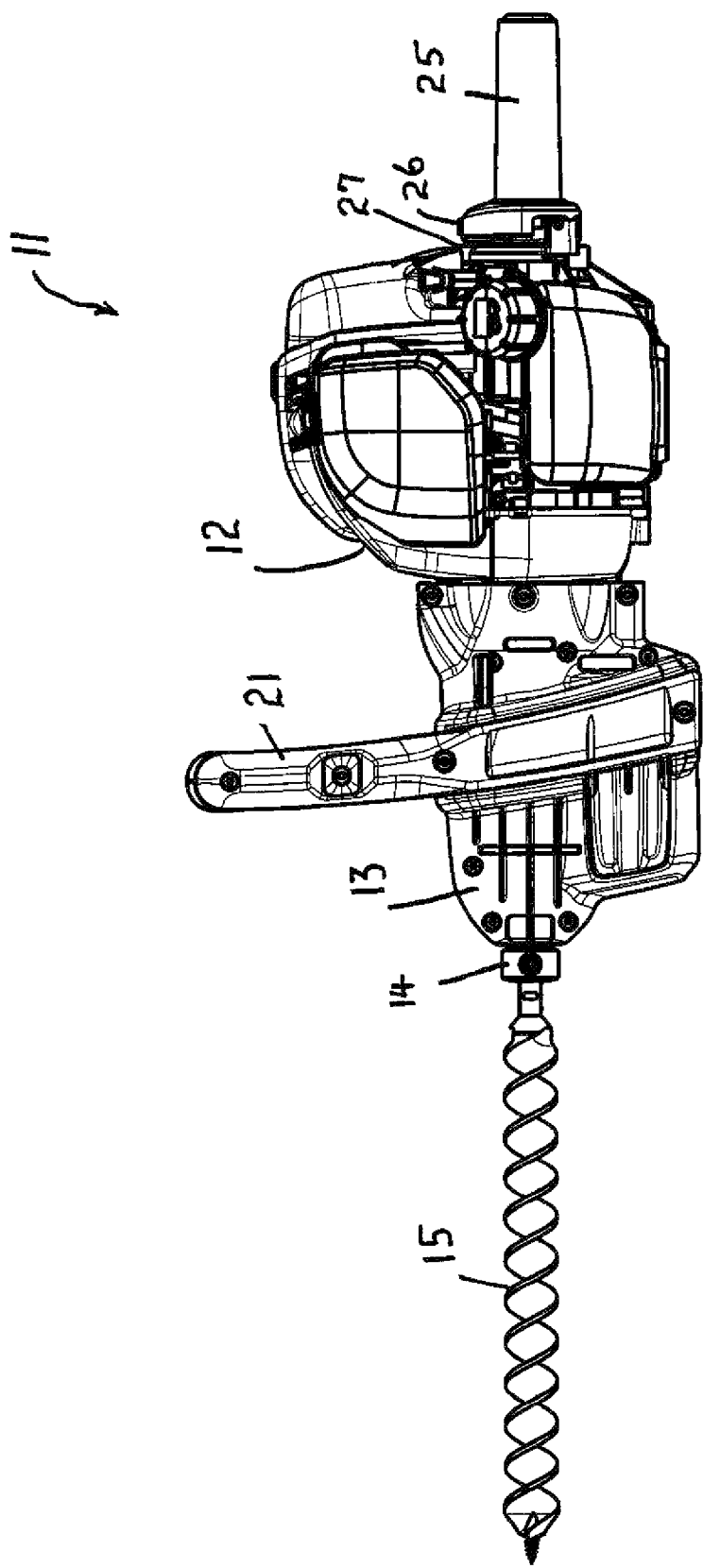
FIG. 3 is a side elevation of the drill unit of FIG. 2.
Figure 4:
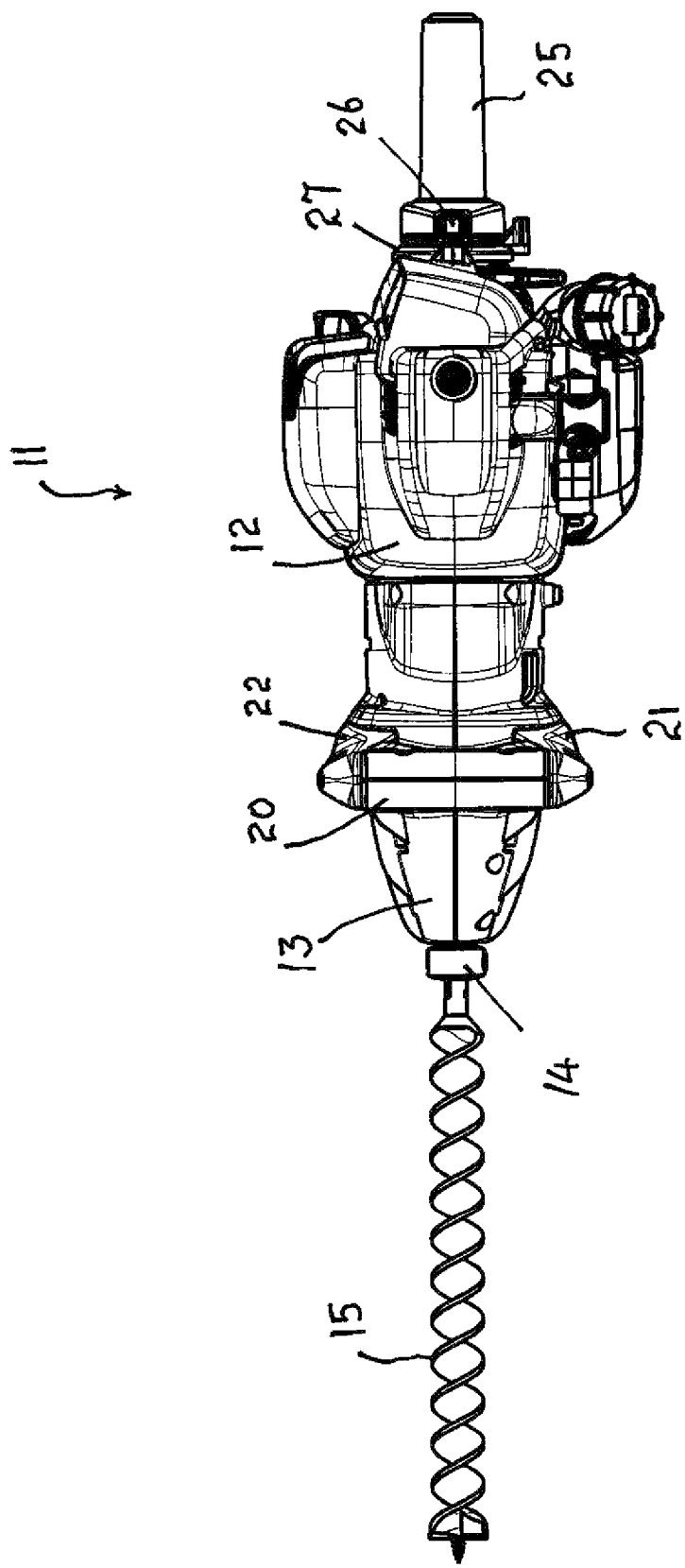
FIG. 4 is a plan view of the drill unit of FIG. 2
Figure 5:
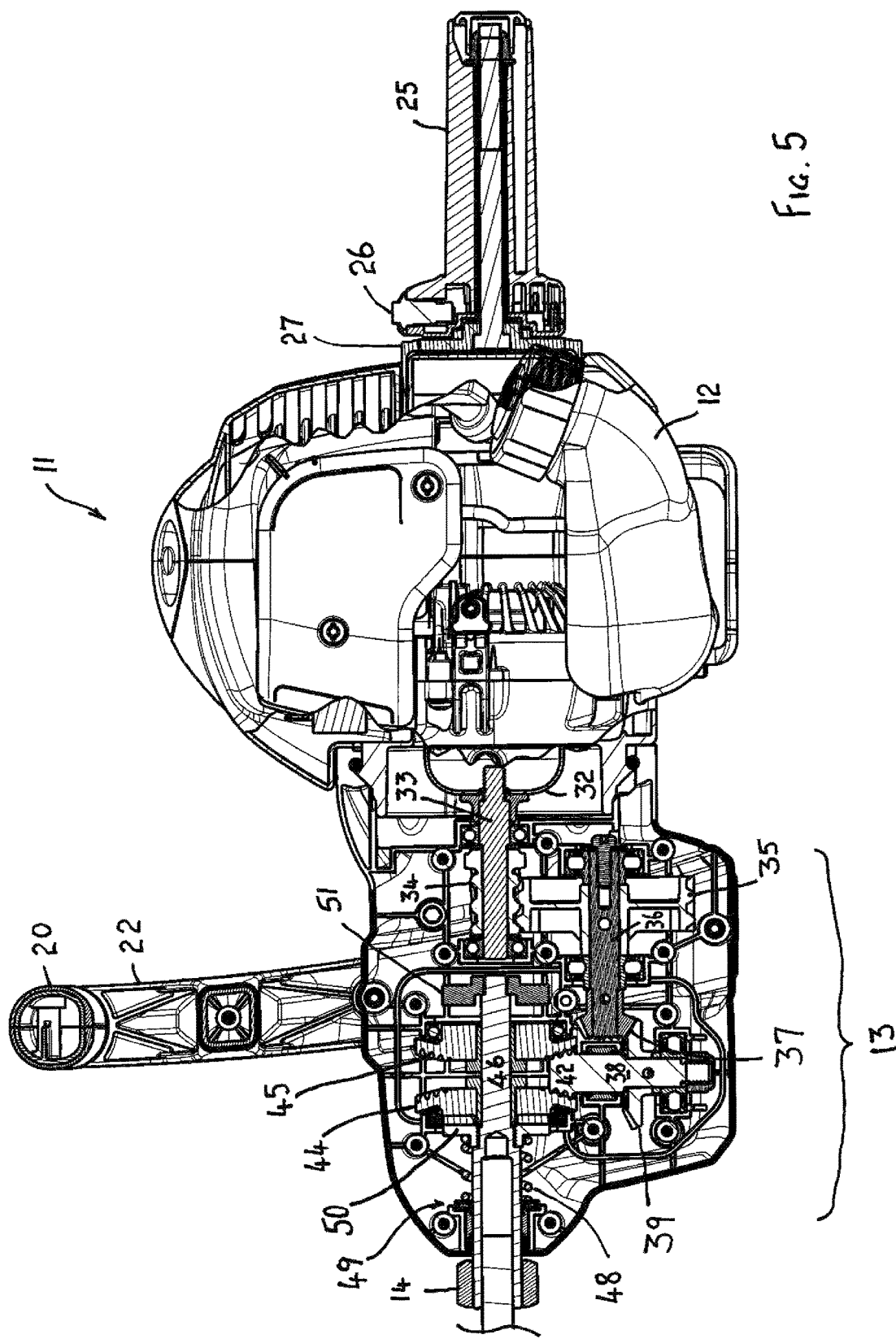
FIG. 5 is a partial longitudinal cross-sectional view of the drill unit of FIG. 2 but with a different engine.

Turning now to FIGS. 2-4, the drill unit 11 of the preferred embodiment has an internal combustion engine 12, a gearbox 13, and a chuck equivalent in the form of a bit holding collar 14 which releasably retains an auger 15. The drill unit 11 is provided with two handles, namely a dorsal handle 20 supported by two uprights 21, 22 and intended to be held by the operator's left hand, and a cylindrical (or slightly frusto-conical) rear handle 25 intended to be held by the operator's right hand. The dorsal handle extends transversely to the longitudinal axis of the drill and is located near to the centre of gravity and thus is substantially balanced. The rear handle 25 is rotatable in the direction of arrow A in FIG. 2 through an arc of 10°-40° so as to increase the speed of the internal combustion engine 12. In this respect the handle 25 is similar to the accelerator of a conventional motorbike. Preferably the handle 25 has a more limited 15°-20° arc of movement than a conventional motor bike accelerator, but this is not essential. Rotating the rear handle 25 in a clockwise direction opposite to that of the arrow A in FIG. 2, reduces the speed of the internal combustion engine 12 until a rest position corresponding to an idle speed is achieved. A cutout switch 26 for the internal combustion engine 12 is mounted at the junction of the handle 25 and the throttle housing 27. The drill unit 11 has a longitudinal axis 30 as illustrated in FIG. 2.

In view of the above handle arrangement, prior to operation, the drill unit 11 is able to be conveniently held in a substantially balanced position by the handle 20 and carried from place to place. This carrying action can be undertaken by either hand of the operator. However, during drilling, the operator's left hand holds the handle 20 and assists to provide the forward pull of the auger 15 through the workpiece, whilst the rear handle 25 is held in the operator's right-hand. By slightly twisting the wrist of the right hand, the operator can control the speed of the internal combustion engine 12 and hence the speed of the auger 15.

In the event of the auger 15 suddenly jamming, the entire drill unit 11 rotates about the longitudinal axis 30 of the drill unit 11 so as to move the handle 20 in an anticlockwise direction as seen in FIG. 2 and as indicated by arrow B in FIG. 2. The magnitude of this reaction force is generally greater than the operator is able to resist and as a consequence, the entire drill unit 11 turns in an anticlockwise direction as seen in FIG. 2. Since the operator is still holding the handle 25, the handle 25 is effectively turned in a clockwise direction relative to the drill unit throttle housing 27 (that is to say, in the direction opposite to the direction of the arrow A in FIG. 2). This has the effect of immediately or instantaneously reducing the throttle setting of the internal combustion engine 12, preferably back to idling speed.

The consequence of the reduction of the throttle is that the drill unit 11 does not spin round and round in an anticlockwise direction as shown in FIG. 2 about the stationary auger 15, as is sometimes the case with some prior art drill units when the auger jams.

Turning now to FIGS. 5-8, the internal mechanisms of the drill unit 11 will now be described. The internal combustion engine 12 is connected to a substantially conventional centrifugal clutch which drives a clutch drum 32 mounted on a horizontal shaft 33. A helix gear 34 is mounted on the shaft and meshes with another helix gear 35 mounted on a second horizontal shaft 36. The forward end of the shaft 36 carries a first pinion gear 37 which drives an intermediate vertical shaft 38 by means of a crown gear 39.

Figure 6:
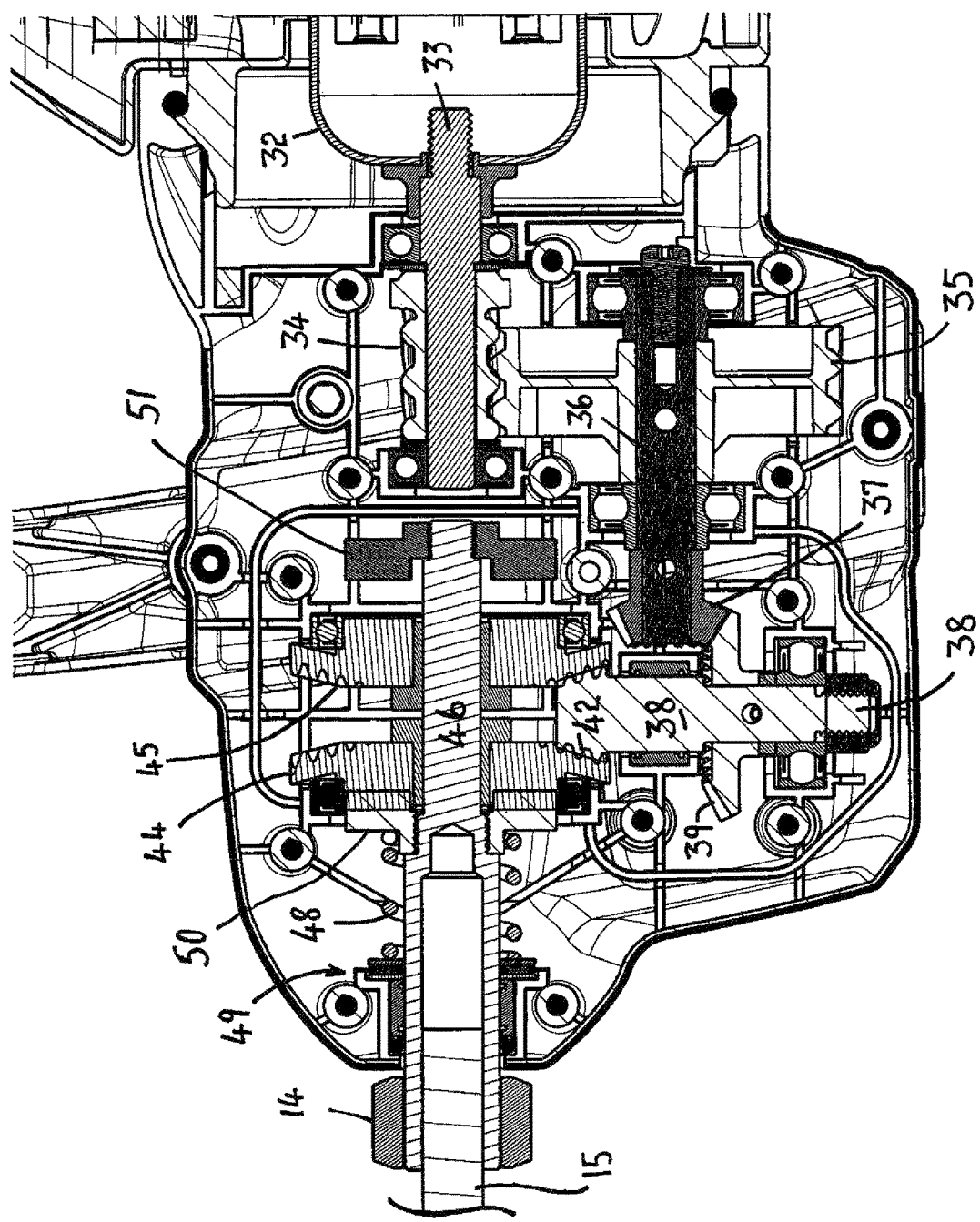
FIG. 6 is an enlarged longitudinal cross-sectional view through the gearbox of the drill unit of FIG. 5 with the forward gear selected.

As seen in FIG. 6, the vertical shaft 38 carries a pinion crown gear 42 which meshes with two permanently rotating final crown gear wheels 44 and 45 respectively. The gear wheels 44 and 45 rotate in opposite directions and have recesses on their non-gear faces to receive the projections of dog clutches. Slidably mounted within the crown gear wheels 44, 45 is the driveshaft 46 which carries the collar 14 to lock the auger 15. In the situation where the driveshaft 46 is driven forwardly (that is the auger 15 rotates in a clockwise direction as seen in FIG. 2) the driveshaft 46 is moved rearwardly by means of a spring 48 which is compressed between a bearing 49 and a (forward) dog clutch 50. The dog clutch 50 engages the recesses of the crown wheel 44 and thereby rotates the drive shaft 46 in the clockwise direction (as seen in FIG. 2).

Figure 7:
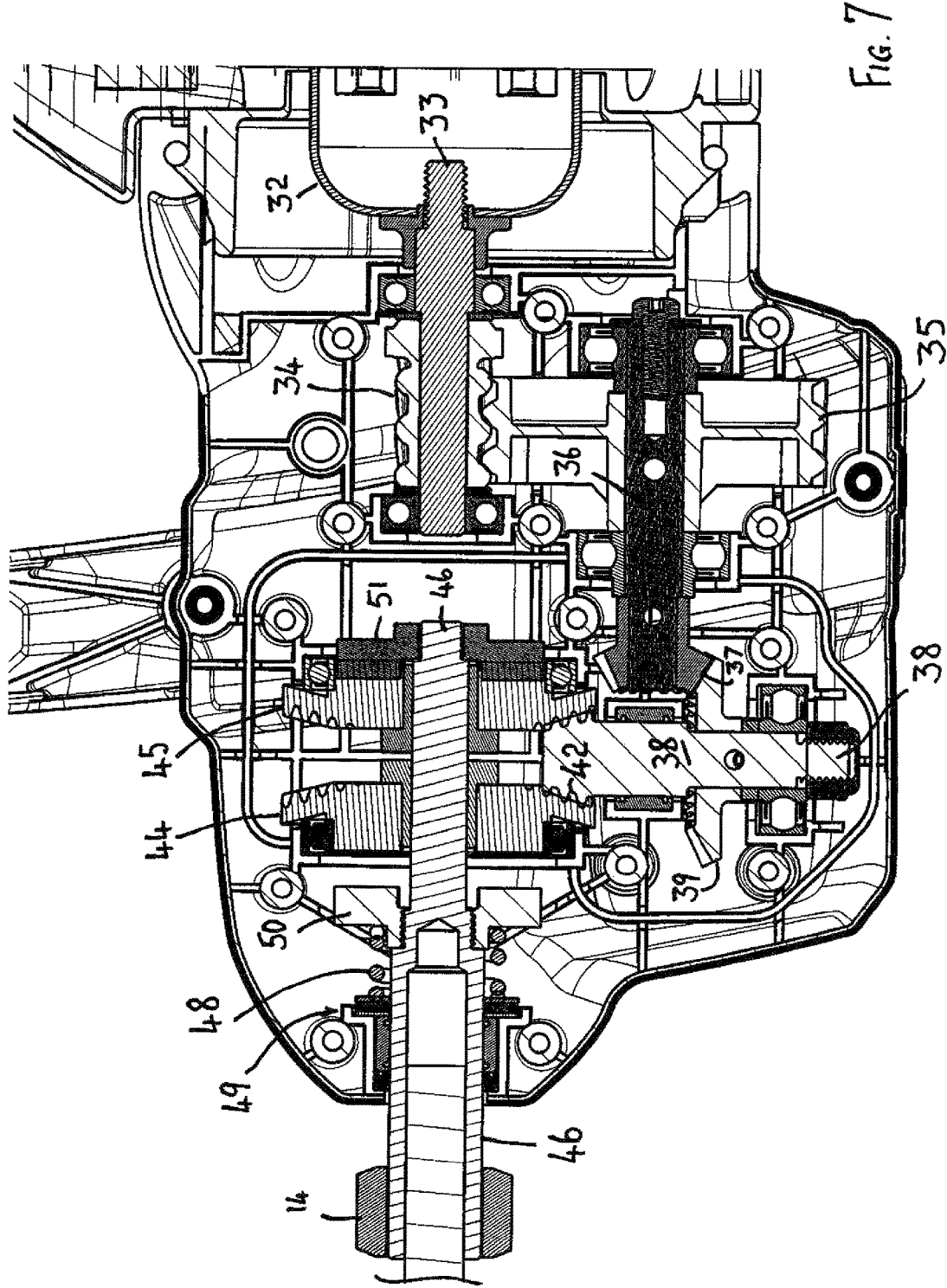
FIG. 7 is a view similar to FIG. 6 but with the reverse gear selected.
Figure 8:
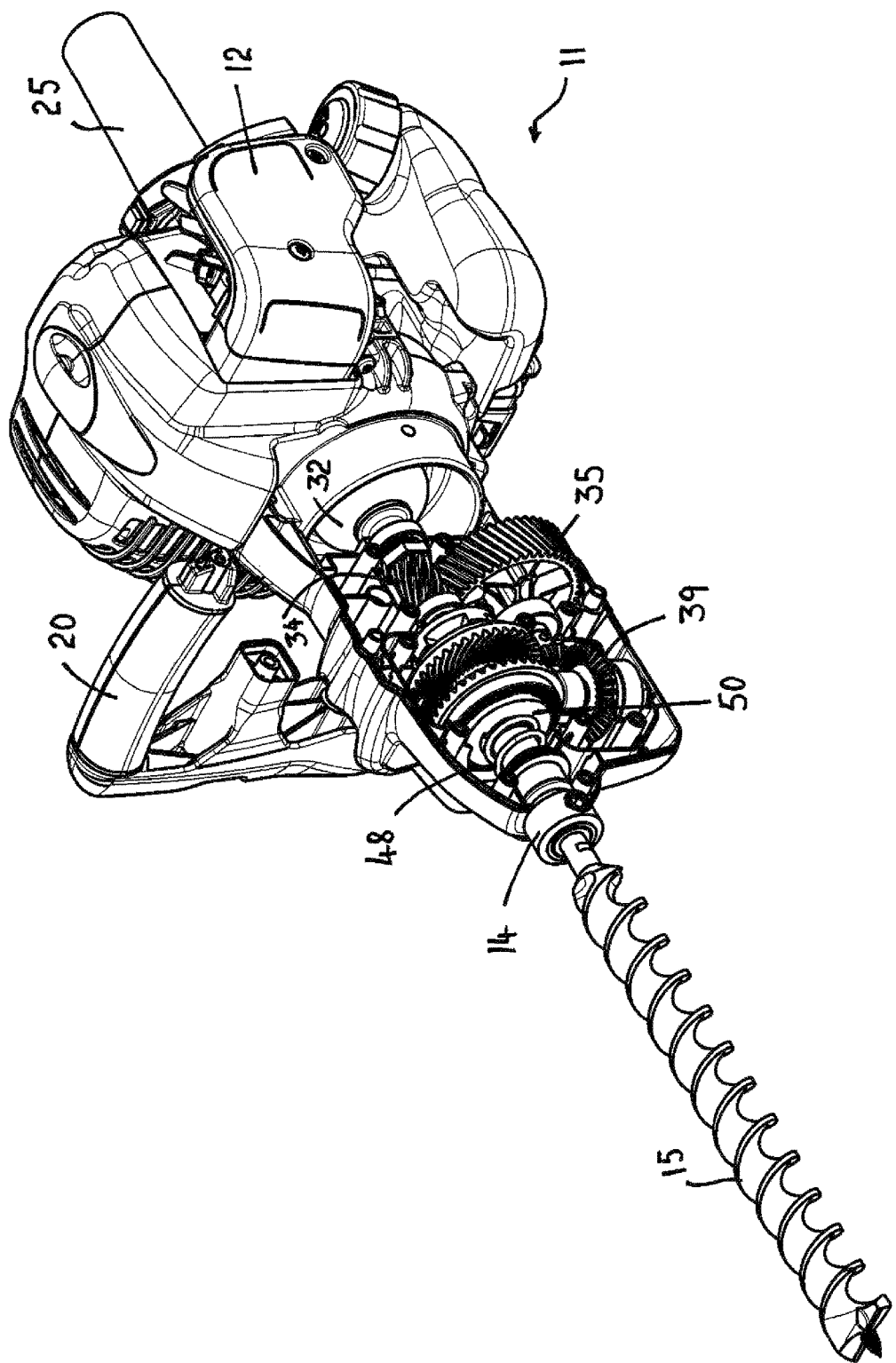
FIG. 8 is a perspective view from the front of the drill unit of FIG. 5 and with the gearbox illustrated.

In the reverse drive configuration, as shown in FIG. 7, the driveshaft 46 is moved forwardly by the operator pulling the drill unit towards the operator whilst the auger 15 is engaged in the workpiece, thereby further compressing the spring 48 so as to disengage the forward dog clutch 50 from the recesses of the crown gear wheel 44 and simultaneously engaging a reverse dog clutch 51 with the recesses of the crown gear wheel 45. This has the effect of rotating the drive shaft 46 in the opposite, or reverse, direction so as to extract the auger 15 from the workpiece.

The strength of the spring 48 is selected so that the driveshaft 46 is driven towards the rear of the drill unit 11 thereby engaging the forward dog clutch 50 and forward crown gear wheel 44. Thus when the auger 15 not engaged in any workpiece, the drill unit is always in forward gear. However, with the auger 15 engaged in the workpiece, the drill unit 11 can be moved rearwardly by the operator pulling on the handle 20. This moves the driveshaft 46 forwardly so as to disengage the recesses of the forward crown gear wheel 44 with the forward clutch 50, and engage the recesses of the reverse crown gear wheel 45 with the reverse dog clutch 51.

The operational consequence of this construction is that during drilling, the auger 15 can be easily and quickly reversed by the operator merely by pulling backwardly on the drill unit via the handle 20. This means that the auger 15 immediately reverses direction and clears the hole being drilled of wood chips and similar debris. Thus, unlike in the prior art arrangement described above, there is no need to reduce the speed of the internal combustion engine to idle to change gears, and the clearing of wood chips can take place momentarily and drilling can be resumed immediately thereafter by pushing the handle 20 forwardly.

Figure 9:
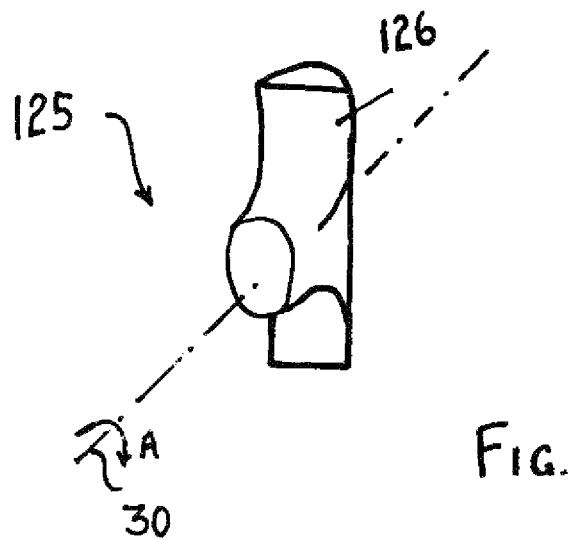
FIG. 9 is a perspective view of a rear handle of a second embodiment having a T-grip.

Turning now to FIG. 9, the rear handle 25 can be replaced and a handle 125 of a second embodiment including a T-grip 126. The handle 125 has a shorter cylindrical body than the handle 25 which is not grasped since the operator grasps the T-grip 126 instead. However, the T-grip 126 can enable the operator's right hand to apply either a forward force, or a rearward force, to the drill unit 11.

In addition, the T-grip 126 is rotated about the axis 30 in the direction of arrow A to increase the engine speed, and in the opposite direction to decreases the engine speed.

Figure 10:
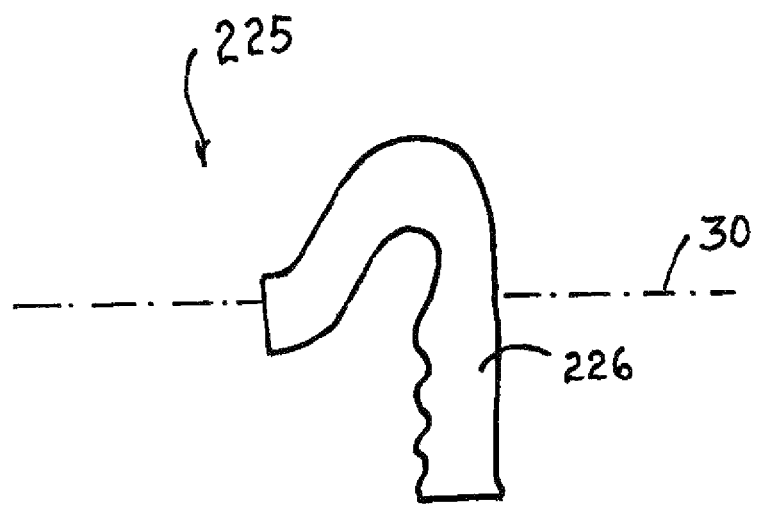
FIG. 10 is a side view of a rear handle of a third embodiment having a pistol grip.

In a third embodiment illustrated in FIG. 10, the rear handle 25 is replaced by a handle 225 which incorporates a pistol grip 226. The handle 225 also has a shorter cylindrical body than the handle 25. The pistol grip 226, like the T-grip 126, can enable the operator's right hand to apply either a forward force, or a rearward force, to the drill unit 11. The pistol grip 226 is similarly rotatable about the axis 30 in opposite directions to increase or decrease the engine speed.

The foregoing describes only some embodiments of the present invention and modifications, obvious to those skilled in the portable powered drill arts, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A portable power drill unit comprising an operational axis having a chuck means at one end and a substantially cylindrical or frusto-conical twist throttle handle at the other end, wherein an engine means to power said chuck means is located between said ends, and wherein rotation of the handle in the direction of forward rotation of the chuck means decreases the drill speed, and rotation of the handle in the direction of reverse rotation of the chuck means increases the drill speed, whereby reaction forces created by a jammed auger rotated by said chuck means decrease the drill speed.

2. The drill unit as claimed in claim 1 wherein said engine means comprises an internal combustion engine.

3. The drill unit as claimed in claim 1 wherein said twist throttle handle is similar to that of a conventional motorbike accelerator.

4. The drill unit as claimed in claim 3 wherein said handle is able to be twisted about its longitudinal axis through an arc of approximately 10°-40°.

5. The drill unit as claimed in claim 1 and having a second handle located in a dorsal position and transverse to said operational axis.

6. A portable power drill unit having an operational axis defined by a chuck means at one end and a substantially cylindrical or frusto-conical twist throttle handle at the other end, a motor located intermediate said chuck means and twist throttle handle, and a second handle located above said motor and extending transversely to said operational axis.

7. The drill unit as claimed in claim 6 wherein said second handle extends between a pair of uprights extending one to either side of the drill unit.

8. The drill unit as claimed in claim 6 wherein the motor is an internal combustion engine.

9. The drill unit as claimed in claim 6 wherein said twist throttle handle includes a T-grip at its free end.

10. The drill unit as claimed in claim 6 wherein said twist throttle handle includes a pistol grip.

11. A portable drill unit having an internal combustion engine, a pair of handles able to be held by an operator, a gearbox including forward and reverse gears, a chuck means, and a forward/reverse selection mechanism connected with said gearbox, said forward/reverse selection mechanism being actuated by a forward force, or a withdrawing force, respectively being applied to said drill unit by an operator holding said handles, wherein a first one of said handles comprises a substantially cylindrical or frusto-conical handle to the rear of said drill unit and substantially aligned with said chuck means, and a second one of said handles is located above said gearbox and extends transversely to said first handle.

12. The drill unit as claimed in claim 11 wherein said chuck means is mounted on a driveshaft which is slidably mounted between a pair of contra rotating crown gear wheels, each of said gear wheels having a first face with teeth and a reverse face with recesses arranged to mate with a cooperating corresponding dog clutch, and a spring interposed between said gear wheels and said drill unit to urge a forward rotating one of said dog clutches into engagement with the corresponding gear wheel, whereby a drill bit or auger mounted in said chuck means is rotated forwardly by said gearbox when said drill bit or auger is not engaged with a workpiece, and is rotated rearwardly when a rearward force is applied by an operator via said handles to said spring.

13. The drill unit as claimed in claim 12 and powered by an internal combustion engine having a centrifugal clutch, wherein said clutch is connected to a first pinion gear which rotates said contra rotating gear wheels.

14. The drill unit as claimed in claim 13 wherein a second pinion gear is interposed between said clutch and said first pinion gear.

15. A method of de-accelerating a portable power drill unit in the event of an auger or drill bit rotated by said drill unit jamming in use, said method comprising the steps of:

rotating the auger or drill bit in a first direction, providing a twist throttle handle having an axis substantially coincident with, or parallel to, the axis of rotation of said auger or drill bit, and arranging for rotation of said twist throttle handle in the direction opposite to the direction of rotation of said auger or drill bit, to increase the speed of said drill unit, and vice versa.

16. A gear train for a drill unit having a substantially aligned driven shaft and an output shaft, said output shaft having a chuck means, said gear train being interposed between said shafts and including an intermediate shaft substantially perpendicular to said aligned shafts, a first pinion gear driving said intermediate shaft, and a second pinion gear rotated by said intermediate shaft and meshed with two counter rotating crown gear wheels, each said counter rotating gear wheel including a clutch means connected with said output shaft, and spring means interposed between said chuck means and said counter rotating gear wheels to selectively engage either one of said clutch means to permit corresponding selective rotation of said output shaft in either direction.

* * * * *